(12) United States Patent
Cottle

(10) Patent No.: US 10,201,150 B1
(45) Date of Patent: Feb. 12, 2019

(54) AUTOMATED WILDLIFE FEEDER AND CAMERA

(71) Applicant: Dustin A. Cottle, Cantonment, FL (US)

(72) Inventor: Dustin A. Cottle, Cantonment, FL (US)

( * ) Notice: Subject to any disclaimer, the term of this patent is extended or adjusted under 35 U.S.C. 154(b) by 244 days.

(21) Appl. No.: 15/060,975

(22) Filed: Mar. 4, 2016

Related U.S. Application Data

(60) Provisional application No. 62/127,918, filed on Mar. 4, 2015.

(51) Int. Cl.
*A01K 5/02* (2006.01)
*A01K 29/00* (2006.01)

(52) U.S. Cl.
CPC .......... *A01K 5/0291* (2013.01); *A01K 29/005* (2013.01)

(58) Field of Classification Search
CPC .. A01K 5/0291; A01K 29/005; A01K 5/0275; A01K 5/0225; A01K 5/0233; A01K 5/0283; A01K 7/02; H04N 5/2258
USPC .......................... 119/51.11, 51.02, 54, 57.91
See application file for complete search history.

(56) References Cited

U.S. PATENT DOCUMENTS

| | | | | |
|---|---|---|---|---|
| 2,785,036 A | * | 3/1957 | Elsden-King | A47B 88/48 312/327 |
| 2,852,167 A | * | 9/1958 | Lempart | A47F 1/03 222/307 |
| 3,193,339 A | * | 7/1965 | Cooper | A47F 5/0037 211/81 |
| 3,966,086 A | * | 6/1976 | Kelso | A47F 1/03 221/234 |
| 3,985,104 A | * | 10/1976 | Klemer | A01K 5/0291 119/51.12 |
| 4,389,976 A | * | 6/1983 | Novak | A01K 5/025 119/62 |
| 5,233,941 A | * | 8/1993 | Ayliffe, Jr. | A01K 5/0241 119/57.91 |
| 5,299,529 A | * | 4/1994 | Ramirez | A01K 5/0291 119/51.11 |
| 5,802,991 A | * | 9/1998 | Brown | E05G 7/008 109/19 |
| 5,954,413 A | * | 9/1999 | Brown | A47B 46/005 292/145 |
| 6,334,407 B1 | * | 1/2002 | Schneider | A01K 1/03 119/51.01 |
| 6,367,417 B1 | | 4/2002 | Gal et al. | |
| 7,051,675 B1 | * | 5/2006 | Mayer | A01K 5/0291 119/51.11 |
| 8,800,488 B2 | | 8/2014 | Stone | |
| 9,750,229 B2 | * | 9/2017 | Stewart | A01K 5/0275 |
| 2005/0212912 A1 | | 9/2005 | Huster | |
| 2007/0144446 A1 | * | 6/2007 | Neckel | A01K 5/0114 119/51.02 |
| 2010/0331086 A1 | | 12/2010 | Cuddeback | |
| 2011/0088625 A1 | | 4/2011 | Nowacek | |

(Continued)

*Primary Examiner* — Tien Q Dinh
*Assistant Examiner* — Ebony E Evans
(74) *Attorney, Agent, or Firm* — Cramer Patent & Design, PLLC; Aaron R. Cramer

(57) ABSTRACT

A wildlife feeder apparatus includes a housing assembly, a plurality of bins independently deployable from the housing assembly, each one (1) of the plurality of bins being configured to hold one (1) of food and water and is accessible from an exterior of the housing assembly when deployed, and a plurality of cameras disposed within the housing assembly and configured to acquire images of an environment around the housing assembly.

4 Claims, 5 Drawing Sheets

(56) References Cited

U.S. PATENT DOCUMENTS

| | | | |
|---|---|---|---|
| 2012/0085288 A1* | 4/2012 | Salinas | A01K 5/0225 |
| | | | 119/51.02 |
| 2013/0222581 A1* | 8/2013 | Wydner | H04N 5/2252 |
| | | | 348/143 |
| 2014/0060439 A1 | 3/2014 | Browning et al. | |
| 2014/0168430 A1 | 6/2014 | Unger | |
| 2014/0209031 A1 | 7/2014 | Norris | |
| 2014/0354807 A1* | 12/2014 | Brandonisio et al. | |
| | | | A45C 11/16 |
| | | | 348/143 |
| 2016/0302383 A1* | 10/2016 | Frieden | A01K 5/02 |

* cited by examiner

AUTOMATED WILDLIFE FEEDER AND CAMERA

RELATED APPLICATIONS

The present invention is a continuation-in-part of, was first described in, and claims the benefit of U.S. Provisional Application No. 62/127,918, filed Mar. 4, 2015, the entire disclosures of which are incorporated herein by reference.

FIELD OF THE INVENTION

The present invention relates generally to wildlife feeding apparatus and, more particularly, to automated wildlife feeding apparatus that includes image capturing capabilities.

BACKGROUND OF THE INVENTION

Over the years, modern advances in hunting equipment have enhanced the sport, providing hunters with increased success. Precision firearms, high-powered optical scopes, high-tech hunting equipment, and the like, have provided hunters a better chance of landing their trophy game animal. Other devices such as game feeders increase the likelihood of animal activity upon a certain area of land.

However, in order to effectively benefit from such equipment, the hunter must be near the same location as the game animal, which is often not practical. Game cameras with remote monitoring capability can be used to identify locations that animals frequent, but such cameras can typically only see one hundred eighty degrees (180°), at best, leaving wide areas open that animals can use without detection. Multiple cameras can be used, but quickly become expensive and complicated to operate and maintain.

Accordingly, there exists a need by which the benefits of an animal feeder and a wide field of view camera system can be combined to produce an apparatus with advantages of both.

SUMMARY OF THE INVENTION

The inventor has recognized the aforementioned inherent problems and lack in the art and observed that there is a need an apparatus that combines the functionality of a deer feeder and multiple game cameras into one (1) easy-to-use piece of hunting equipment. The disclosed combination camera and wildlife feeder, which will be described in greater detail herein, substantially departs from conventional solutions to fulfill this need by providing hunters an indispensable edge in hunting wild game.

In one (1) embodiment, the disclosed wildlife feeder apparatus includes a housing assembly, a plurality of bins independently deployable from the housing assembly, each one of the plurality of bins being configured to hold one (1) of food and water and is accessible from an exterior of the housing assembly when deployed, and a plurality of cameras disposed within the housing assembly and configured to acquire images of an environment around the housing assembly.

In another embodiment, the disclosed wildlife feeder apparatus includes a housing assembly including a plurality of side panels, a top panel, and a bottom panel, a plurality of leg assemblies attached to the bottom panel and configured to support the housing assembly, a plurality of bins independently deployable from the plurality of side panels, each one (1) of the plurality of bins being configured to hold one (1) of food and water accessible from an exterior of the housing assembly when deployed, a plurality of cameras disposed within the housing assembly and configured to acquire images of an environment within a three hundred sixty degree (360°) field of view around the housing assembly, each one (1) of the plurality of cameras including a lens extending through the plurality of side panels, and a control module electrically connected to and configured to control deployment of the plurality of bins and acquisition of the images by the plurality of cameras.

Furthermore, the described features and advantages of the various embodiments disclosed by the present disclosure may be implemented or combined in various manners as one skilled in the relevant art will recognize. The various implementations and/or combinations can be practiced without one (1) or more of the features and advantages described in any particular disclosed embodiment.

Further advantages of the embodiments disclosed by the present disclosure will become apparent from a consideration of the drawings and ensuing description.

BRIEF DESCRIPTION OF THE DRAWINGS

The advantages and features of the various embodiments disclosed by the present disclosure will become better understood with reference to the following more detailed description and claims taken in conjunction with the accompanying drawings, in which like elements are identified with like symbols, and in which:

Figure 1:
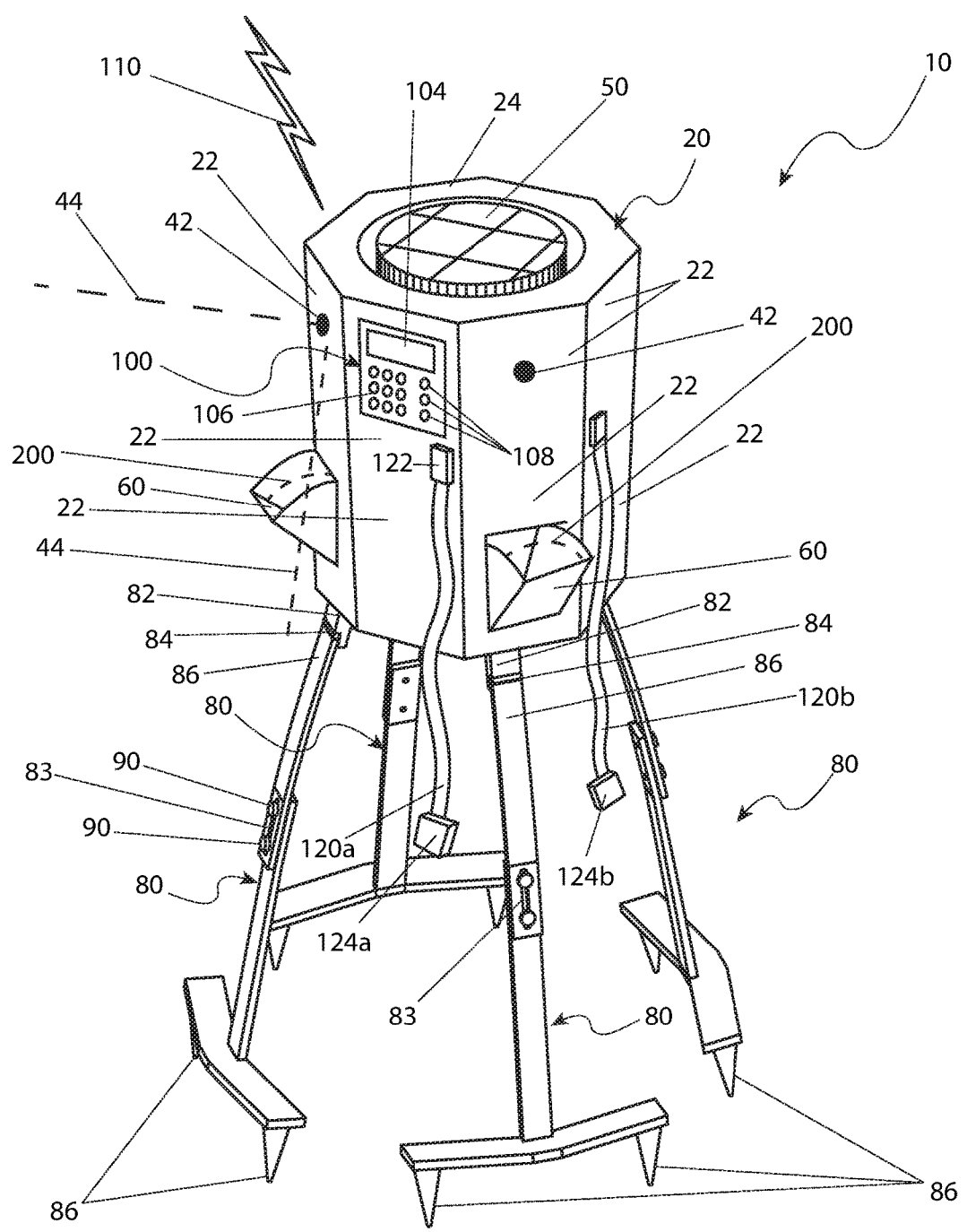
FIG. 1 is a perspective view of a combination camera and wildlife feeder, according to one (!) embodiment of the present invention.

DESCRIPTIVE KEY 10 combination camera and wildlife feeder
20 housing assembly
21 inner space
22 side panel
24 top panel
26 bottom panel
28 feed bin opening
30 battery compartment
32 access panel
34 latch
36 battery
38 battery connector
40 camera
42 lens
44 viewing angle
50 solar panel
60 bin
62 bin hinge
64 actuator
65 first pivot pin
66 actuator shaft 67 first eyelet
68 second pivot pin
69 second eyelet
70 clevis anchor
79 foot
80 leg assembly
81a upper leg section
81b lower leg section
82 leg bracket
83 adjusting slot
84 leg hinge
86 ground spike
88 ground surface
90 fastener
100 control module
102 wiring
104 display
106 keypad
108 function button
110 wireless signal
112 global positioning system (GPS)
114 antenna
120a first carrying strap
120b second carrying strap
122 strap anchor plate
124a first buckle half
124b second buckle half
200 animal feed/water
210 wildlife

DETAILED DESCRIPTION OF THE
PREFERRED EMBODIMENT

In accordance with the disclosed invention, the best mode is presented in terms of one (1) or more of the disclosed embodiments, herein depicted within FIGS. 1-5. However, the disclosure is not limited to a single described embodiment and a person skilled in the art will appreciate that many other embodiments are possible without deviating from the basic concept disclosed by the present disclosure and that any such work around will also fall under its scope.

Further, those skilled in the art will recognize that other styles and configurations can be incorporated into the teachings of the present disclosure, and that the example configurations shown and described herein are for the purpose of clarity and disclosure and not by way of limitation.

As used herein, the singular terms "a", "an", and "the" do not denote a limitation of quantity, but rather denote the presence of at least one (1), as well as a plurality of, the referenced items, unless the context clearly indicates otherwise.

As used herein, the terms "first", "second", "third", etc. are used as labels to describe various elements, features, and/or components, and are not intended to impose ordinal, positional, or hierarchical requirements on the referenced items, unless other indicated. For example, such terms may be used to distinguish one (1) element from another element.

As used herein, relative terms, if any, such as "front", "rear", "left", "right", "top", "bottom", "below", "above", "upper", "lower", "horizontal", or "vertical" are used to describe a relationship of one (1) element, feature and/or region to another element, feature and/or region as illustrated in the figures.

Referring to FIGS. 1-5, disclosing combination camera and wildlife feeder (herein described as the "apparatus") 10, where like reference numerals represent similar or like parts. Generally, the disclosed apparatus 10 provides cameras 40 and feeding bins 60 being integrated into a housing 20, which is elevated above a ground surface 88 by a plurality of folding leg assemblies 80.

Figure 2:
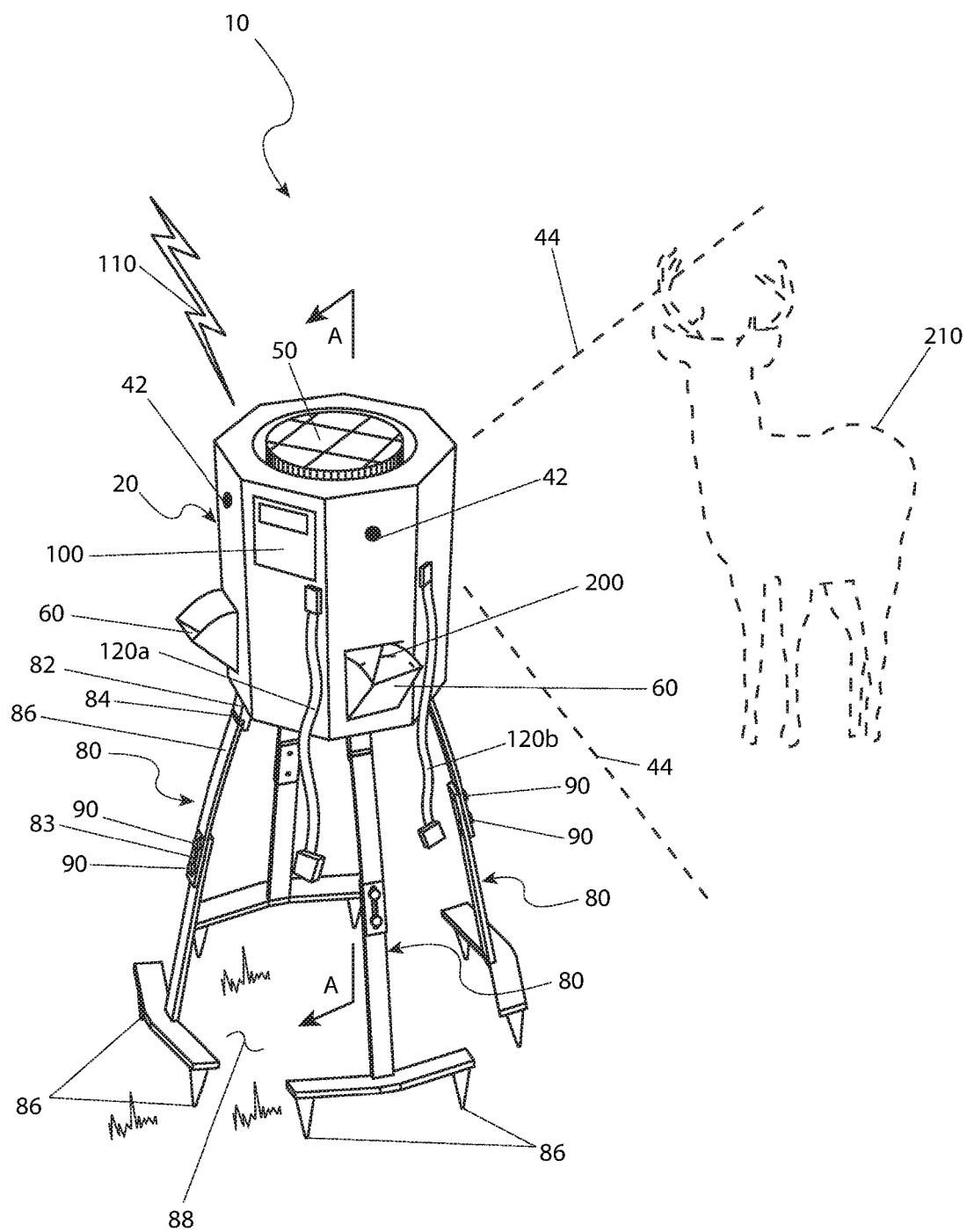
FIG. 2 is an environmental perspective view of the combination camera and wildlife feeder, according to one (1) embodiment of the present invention.
Figure 3:
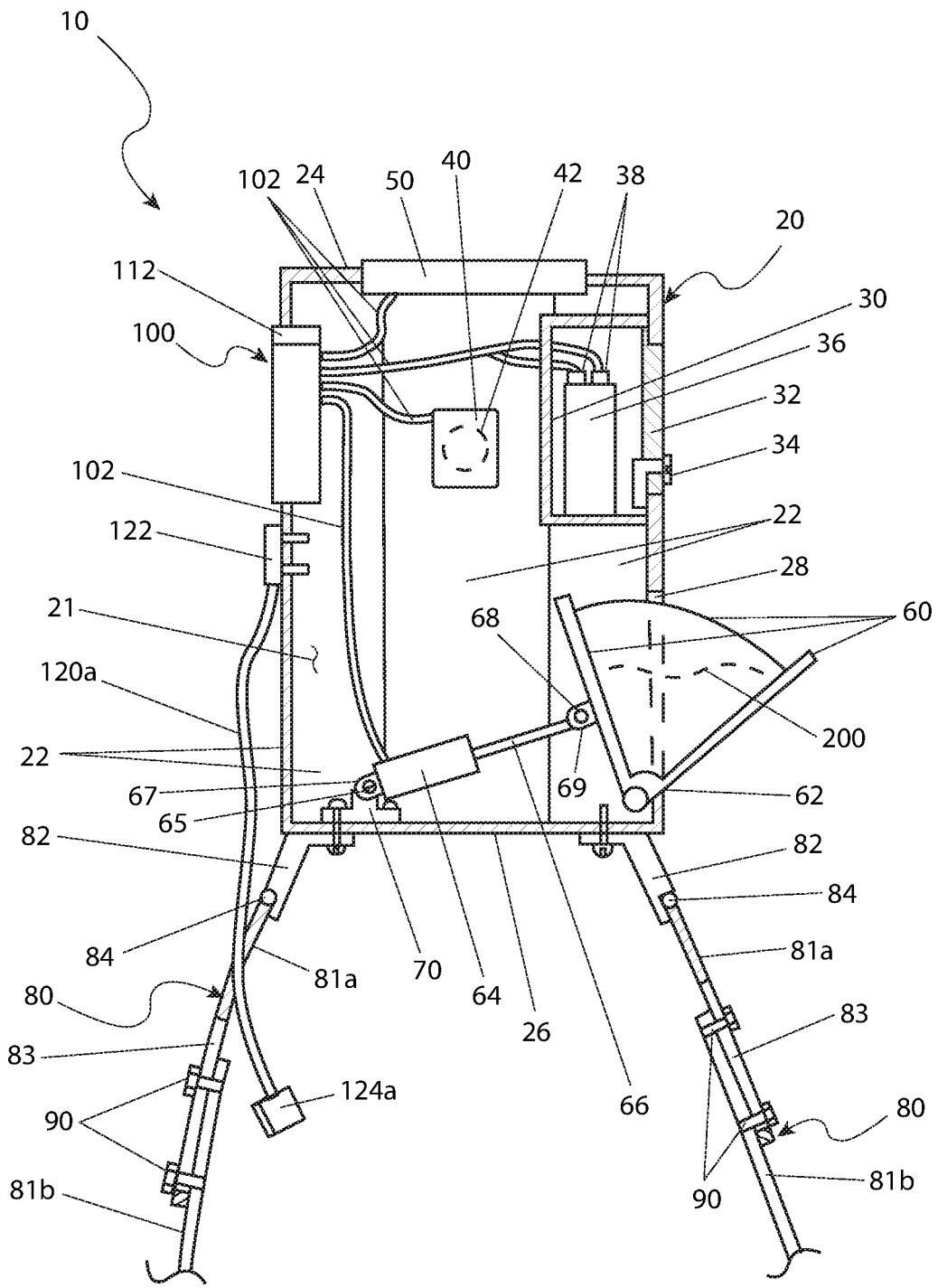
FIG. 3 is a sectional side elevation view of the combination camera and wildlife feeder of FIG. 2 taken along section line A-A.

Referring to FIG. 3 and with reference to FIGS. 1 and 2, in one (1) example embodiment, the disclosed apparatus 10 includes a housing assembly 20 having an interior space 21 that contains a plurality of cameras 40, a battery compartment 30, a plurality of deployable bins 60, and a control module 100. The housing assembly 20 rests upon a plurality of supporting leg assemblies 80 and is powered by a battery 36, a solar panel 50, or a combination of the battery 36 and the solar panel 50.

Referring to FIGS. 1-3, in an example embodiment, the housing assembly 20 has a generally cylinder shaped and forms a sealed and weather-resistant enclosure. As an example, the housing assembly 20 includes a plurality of side panels 22, a top panel 24, and a bottom panel 26. In another example embodiment, the housing assembly 20 includes a non-reflective outer painted finish, such as camouflage or the like, to at least minimize, if not prevent, visual detection by a game animal (e.g., wildlife 210).

Referring to FIGS. 1 and 2, the example embodiment of the housing assembly 20 is depicted as having an enclosure made up of eight (8) equally-sized rectangular side panels 22 and having four (4) camera lens 42 positioned upon every other side panel 22 to provide a collective photographic panoramic view. In other example embodiments, the housing assembly 20 may be cylindrical in shape or may include a different number of flat panels with equal benefit, and without limitation. Similarly, any number of cameras 40 may be arranged and spaced along an exterior surface of the housing 20 so as to provide a full three hundred sixty degree (360°) view of the environment around the apparatus 100.

Referring to FIG. 3, and with reference to FIGS. 1 and 2, as an example, the cameras 40 are digital cameras capable of obtaining, storing, and wirelessly communicating captured images of wildlife 210 (FIG. 2). As another example, the cameras 40 also include motion detecting sensors (not shown) and circuitry, or equivalent means, to automatically initiate image capturing in response to detection of movement in proximity to the apparatus 10. In another example, separate motion detectors (not shown) may be utilized and electronically coupled to the cameras 40 or otherwise integrated into the apparatus 10.

Referring to FIG. 2, and with reference to FIGS. 1 and 3, each camera 40 includes a lens 42 that protrudes out through a respective side panel 22 of the housing 20. The example embodiment of the apparatus 10 depicted in FIGS. 1 and 2 includes four (4) cameras 40 with each lens 42 providing a minimum viewing angle 44 (FIG. 2) of ninety degrees) (90°, thereby providing a full three hundred sixty degree (360°) view around the apparatus 10. Each lenses 42 is positioned to provide a clear view of a respective subjacent feeding bin 60 in order to view a level of animal feed/water 100 within the corresponding bin 60.

Referring to FIG. 3, and with reference to FIGS. 1 and 2, in an example embodiment, the housing assembly 20 includes a plurality of bins 60 capable of selectively presenting animal feed/water 200 or the like, to lure and position wildlife 210 to be photographed using the cameras 40. As an example, each bin 60 takes on a shape of a quarter-cylinder or similarly shaped container, for example, having quarter-circle side portions and an open top portion. When in a closed state, each bin 60 is flush with the respective side panel 22 of the housing assembly 20. Each bin 60 may be tilted outwardly about a single-axis bin hinge 62 integrated within a lower edge portion, thereby exposing the open top portion of the bin 60 and enabling access to the contained animal feed/water 200 by the wildlife 210.

Referring to FIG. 3, in one (1) example, the bin 60 is tilted (e.g., outwardly and inwardly) using a linear solenoid-type actuator 64 or equivalent electrically triggered device, to expose the open top portion. As an example, the actuator 64 includes an extending linear actuator shaft 66. An eyelet 67 of the actuator 64 is secured at a first pivot pin 65. A second pivot pin 68 pivotally connects a second eyelet 69 to provide connection to the bin 60. A clevis-type anchor 70 is pivotally secured to a first eyelet 67 on the bottom panel portion 26 of the housing assembly 20. As an example, the actuator 64 is an electro-magnetic linear device in electrical communication with the control module 100 via wiring 102.

Referring to FIGS. 1-3, in another example embodiment, each leg assembly 80 includes an upper section 81*a* and a lower section 81*b*. The upper section 81*a* of each leg assembly 80 is hingedly connected to the bottom panel 26 of the housing assembly 20 using an "L"-shaped leg bracket 82. The leg bracket 82 is affixed to the bottom panel 26 using fasteners 90. The upper leg section 81*a* is connected to the leg bracket 82 via a hinge 84.

The leg sections 81*a*, 81*b* provide for vertical adjustment of the housing assembly 20 allowing a user to position the housing assembly 20 a desired distance above the ground surface 88 via an elongated adjusting slot 83. The adjusting slot 83 is formed or machined through a portion of the upper leg section 81*a*. The adjusting slot 83 receives a pair of fasteners 90 therethrough that are threadingly engaged with the parallel and subjacent lower leg section 81*b*. In use, the fasteners 90 are loosened and the leg sections 81*a*, 81*b* slidingly positioned relative to each other to obtain a desired height of the housing assembly 20. The fasteners 90 are then tightened to secure the combined length of the leg sections 81*a*, 81*b*.

Referring to FIGS. 1 and 2, in another example embodiment, the bottom section 81*b* of each leg assembly 80 includes an inverted "T"-shaped structure having the foot 79 positioned parallel to the ground surface 88 to provide stability. As an example, the foot 79 includes a plurality of downwardly extending ground spikes 86 that are intended to penetrate the ground surface 88 to provide additional stability.

Figure 5:
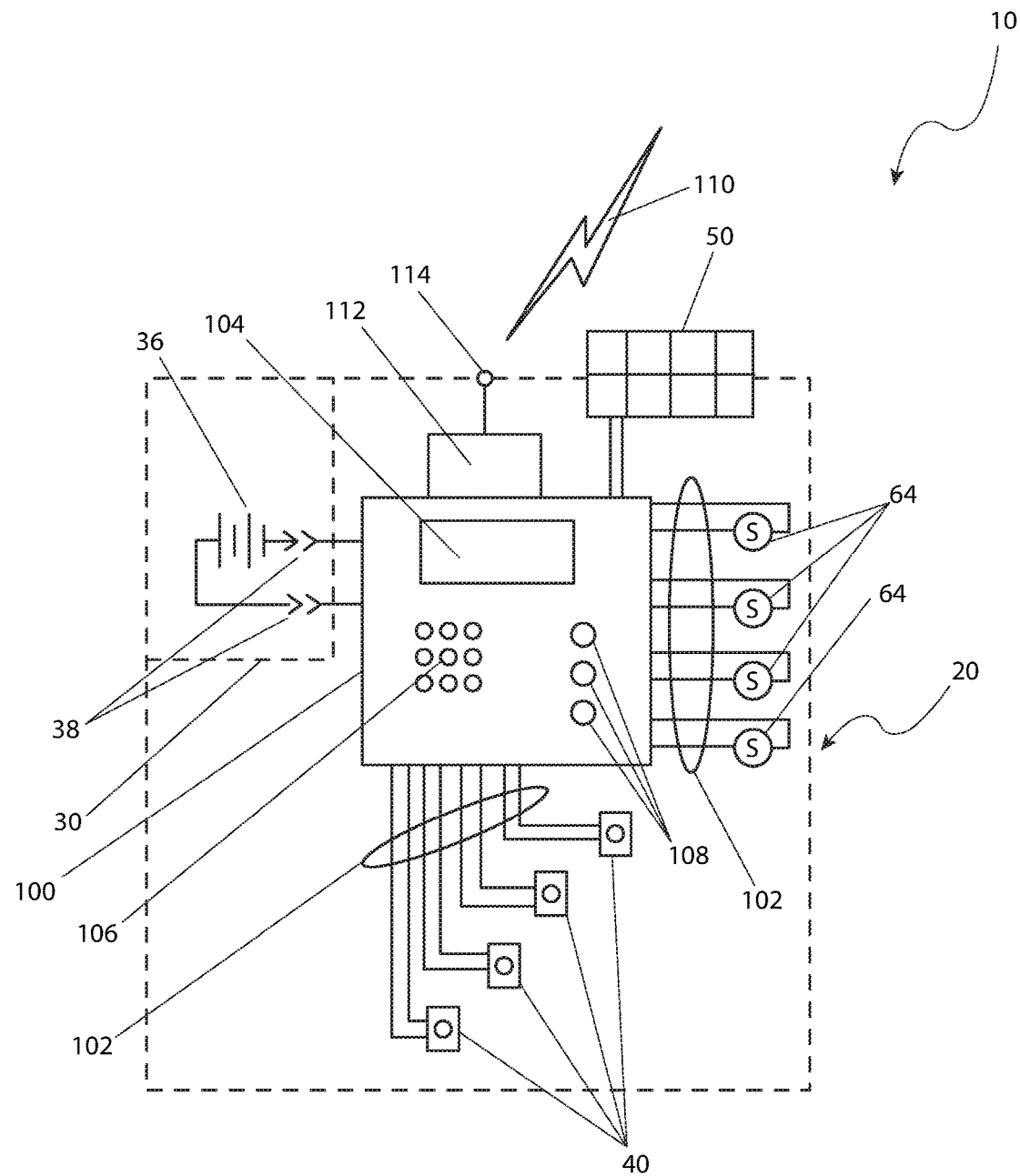

Referring to FIG. 5, and with reference to FIG. 3, in another example embodiment, the control module 100 is configured to provide various electrical, electronic, and communication functions to enable remote and on-site initiation and deployment of the cameras 40 and the feeding bins 60. The control module 100 provides a protective enclosure of equipment such as, but not limited to: circuit boards, microprocessors, a locating GPS unit 112, a digital display screen 104, a keypad 106 to enter data, a plurality of function buttons 108 to make selections and access menus, embedded software, memory chips, relays, and a radio frequency transceiver. The control module 100 is in electrical communication with the battery 36, the cameras 40, the solar panel 50, and each solenoid actuator 64, via interconnecting wiring 102. The control module 100 is configured to receive digital images from the cameras 40, process the images, store the images within memory chips, and wirelessly communicate (e.g., transmit) the stored images to a remote display device such as cell phone, a computer, and the like. Additionally, the control module 100 is configured to wirelessly communicate "real-time" images obtained by the cameras 40 to a remote display device such as cell phones, computers, or the like, to perform functions such as checking the animal feed/water 200 levels in the bins 60.

While present at the location of the apparatus 10, a user may utilize the display screen 104, keypad 106, and function buttons 108 to program and configure the functions of the apparatus 10 to perform various automatic photographic and animal feeding functions such as, but not limited to: enabling each camera 40 to automatically acquire still images at a pre-programmed frames per second rate upon detecting motion within a respective field of view 44; automatically storing the captured images onto a memory chip within the control module 100; and, selectively deploying or closing a desired number of bins 60 based upon a user's preference. A user may also display information and data such as battery charge level, number of stored pictures, and the like, upon the digital display 104 as needed.

Furthermore, the control module 100 contains equipment and software necessary to enable wireless communication of the previously described functions to a remote device such as a cell phone. The control module 100 includes an internal transceiver that provides an RF signal 110 (FIG. 5) to provide wireless two-way communication. As an example, the remote device would be equipped with corresponding software or an application ("app") to enable and perform the various functions of the apparatus 10 such as, but not limited to: viewing the stored images on the remote device; uploading the stored images to the remote device; transmitting a "real-time" image from one (1) or more cameras 40 to the remote device; changing the software settings of the apparatus 10 remotely; initiating one (1) or more cameras 40 to acquire a "real-time" image; querying the control module 100 for information and data such as battery charge level, number of stored pictures, and the like.

Referring to FIG. 3, and with reference to FIG. 5, as an example, the control module 100 is also capable of managing and regulating power from the top-mounted solar panel 50, for example, to power the apparatus 10 or to charge the battery 36. As an example, the battery 36 is a deep-cycle solid core ion or equivalent battery technology. The battery 36 is contained within a battery compartment 30 of the housing assembly 20. The battery compartment 30 may be accessed through an access panel 32 that is secured with a latch 34. The battery 36 may be removed for replacement via a pair of battery connectors 38.

Referring to FIG. 5, and with reference to FIG. 3, in another example embodiment, the control module 100 includes a locating GPS 112 to enable locating the apparatus 10 as well as acting as a security and tracking means.

Figure 4:
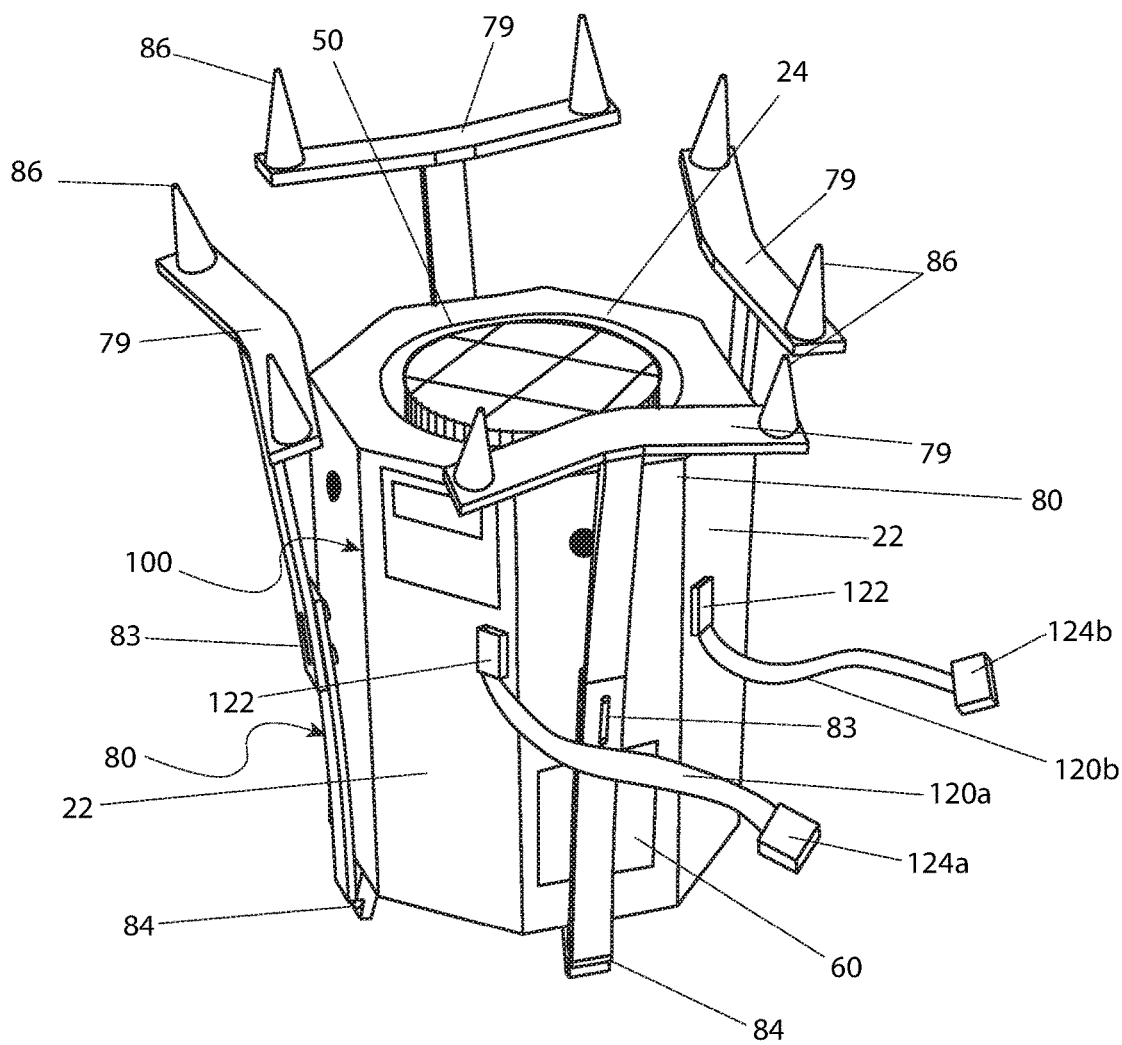
FIG. 4 is a perspective view of the combination camera and wildlife feeder depicting a folded state, according to one (1) embodiment of the present invention; and, FIG. 5 is an electrical schematic diagram of the combination camera and wildlife feeder, according to one (1) embodiment of the present invention.

Referring to FIG. 4, in another example embodiment, the apparatus 10 is configured for compact transport by a user via the hinged leg assemblies 80. The hinges 84 are located adjacent to the housing assembly 20 and allow upward rotation of the upper 81*a* and lower 81*b* leg sections against the housing assembly 20, thereby providing a collapsed configuration for easy carrying of the apparatus 10 to a destination.

Additionally, in another example embodiment, the apparatus 10 includes a pair of carrying straps 120*a*, 120*b* to aid in transporting the apparatus 10 over a distance. The example embodiment of the apparatus 10 depicted in FIGS. 1, 2 and 4 has a pair of carrying straps 120*a*, 120*b*, each affixed to the housing assembly 20 and including a strap anchor plate 122 and a buckle portion 124 affixed to opposing end portions. The carrying straps 120*a*, 120*b* may be wrapped around a torso of the user and joined together using the buckle halves 124*a*, 124*b*. In other example embodiments, other numbers of, and styles of, carrying straps 120*a*, 120*b* may be utilized with equal benefit and without limitation.

Referring to FIG. 5, in another example embodiment of the disclosed apparatus 10, the control module portion 100 provides equipment to provide control and operation of the apparatus 10. As examples, the control module 100 includes microprocessors, an integrated GPS unit 112, a digital display screen 104, a numeric keypad 106, a plurality of function buttons 108 to make selections and access menus, embedded software, memory chips, relays, and an RF transceiver. The control module 100 is in electrical communication via interconnecting wiring 102, with the battery 36, a plurality of cameras 40, a solar panel 50, and a plurality of solenoid-type actuators 64. The control module 100 includes programming to control individual automatic activation of each camera 40 to acquire still images at a pre-programmed rate, and to store the images onto a memory chip, as well as to selectively deploy or close a desired number of feeding bins 60.

Programming of the control module 100 may be obtained locally using the display screen 104, the numeric keypad 106, and the function buttons 108. A user may also display information and data such as battery charge level, number of stored pictures, and the like, upon the digital display 104 as needed.

In another example embodiment, the apparatus 10 may be programmed and operated remotely from a remote device (not shown), such as a cell phone, via of a two-way RF signal 110 (FIG. 5) being transmitted from an internal transceiver (not shown).

In another example embodiment, the GPS 112 and corresponding antenna 114 would work in conjunction with a companion general packet radio service (GPRS), or equivalent service, to transmit a signal 110 from the apparatus 10 to a radio receiver, allowing satellite technology to receive telemetry data. The internal locating GPS unit 112 and corresponding antenna 114 enable locating the apparatus 10, as well as acting as a security and tracking means in the event the apparatus 10 is stolen.

Those skilled in the art will recognize that other styles and configurations of the disclosed apparatus 10 can be easily incorporated into the teachings of the present disclosure, and only particular configurations have been shown and described for purposes of clarity and disclosure and not by way of limitation of scope.

The example embodiments of the present invention can be utilized by the common user in a simple and effortless manner with little or no training. After initial purchase or acquisition of the apparatus 10, it would be arranged and utilized as indicated in FIGS. 1-5.

An example embodiment of the disclosed method for utilizing the apparatus 10 may be include a series of steps, including: acquiring the apparatus 10; installing a freshly charged battery 36 into the battery compartment 30 (e.g., using the access panel 32 and latch 34); transporting the apparatus 10 to a remote destination within a wildlife habitat by folding the leg assemblies 80 upward against the housing assembly 20; wrapping the carrying straps 120a, 120b around the user's torso or position over a shoulder to aid in carrying the apparatus 10; arriving at a destination; deploying the leg assemblies 80 outwardly about the hinges 84; mounting the apparatus 10 to a ground surface 88 by pressing down upon the leg assemblies 80, allowing the ground spikes 86 of each leg assembly 80 to penetrate the ground surface 88; activating and programming the apparatus 10 to acquire still images using the display 104, keypad 106, and function button 108 features on the housing assembly 20; loading animal feed/water 200 into the bins 60 by deploying a desired number of bins 60 using the aforementioned programming features; filling the bins 60 with desired animal feed/water 200; closing the bins 60, if desired, using the aforementioned programming features; abandoning the apparatus 10 for a period of time; allowing the solar panel 50 to provide electrical current to charge the battery 36; monitoring the apparatus 10 from a remote location by communicating with a transceiver of the control module 100 using a display device such as a cell phone, computer, or the like; utilizing the display device to view or upload current or stored images acquired by the cameras 40; utilizing the display device to view the level of the animal feed/water 200 in each deployed bin 60 as a means to communicate to a user that the bin(s) 60 need to be replenished; utilizing the display device to program or change the settings on the apparatus 10 as needed or desired; and, benefiting from an effective photography and animal feeding method, afforded a user of the present invention 10.

The foregoing descriptions of the example embodiments have been presented for purposes of illustration and description. Each example embodiment may or may not include all of the elements described in any other example embodiment. The example embodiments are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

The invention claimed is:

1. A wildlife feeder apparatus comprising:
 a housing assembly defining a housing volume and comprising:
  a plurality of side panels;
  a top panel; and,
  a bottom panel;
 a plurality of leg assemblies attached to said bottom panel and configured to support said housing assembly;
 a plurality of bins connected to said side panels and located within feed bin openings formed in said side panels, each one of said plurality of bins comprising a bin back wall and a bin front wall, connected at a lower edge to said bin back wall, and defining a bin volume to hold one of food and water, and each one of said plurality of bins being independently deployable from said plurality of side panels, each one of said plurality of bins being configured to hold housing assembly and pivotally moveable along said lower edge of said bin front wall relative to an associated one of said side panels between a first pivotal orientation, in which said bin front wall is aligned with said side panel and said bin volume is located within said housing volume, and a second pivotal orientation, in which said bin back wall is aligned with said side panel and said bin volume is located outside of said housing assembly, such that said one of food and water is accessible from an exterior of said housing assembly when deployed;
 a plurality linear actuators disposed within said housing assembly, each one of said plurality of linear actuators being operatively connected to an associated one of said plurality of bins to deploy said associated one of said plurality of bins;
 a plurality of cameras disposed within said housing assembly and configured to acquire images of an environment within a 360-degree field of view around said housing assembly, each one of said plurality of cameras comprising a lens extending through said associated one of said plurality of side panels; and, a control module electrically connected to and configured to control deployment of said plurality of bins and acquisition of said images by said plurality of cameras.

2. The apparatus of claim 1, wherein said control module is configured to automatically deploy said plurality of bins in response to at least one of a predetermined time and motion detected within a predetermined proximity of said housing assembly.

3. The apparatus of claim 1, wherein said control module is configured to automatically acquire said images with at least one of said plurality of cameras in response to at least one of a predetermined time and motion detected within a predetermined proximity of said housing assembly.

4. The apparatus of claim 1, wherein said control module further comprising a radio transceiver and an antenna configured to at least one of receive control input signals, transmit operational status signals, and transmit said images.

\* \* \* \* \*